United States Patent [19]

Maries et al.

[11] 3,770,403

[45] Nov. 6, 1973

[54] METHOD OF MAKING MAGNETIC HEAD ASSEMBLY HAVING GLASS CERAMIC BONDED PARTS

[75] Inventors: Keith Maries, London; Derek Frank Case, Sunbury-on-Thames, both of England

[73] Assignee: International Computers Limited, London, England

[22] Filed: June 11, 1971

[21] Appl. No.: 152,195

[30] Foreign Application Priority Data

June 16, 1970 Great Britain .................. 29,070/70

[52] U.S. Cl. .......................... 65/43, 29/603, 65/59, 179/100.2 C

[51] Int. Cl. .......................................... G11b 5/42

[58] Field of Search ............... 179/100.2 C, 100.2 P; 340/174.1 F; 346/74 MC; 29/603; 65/43, 59

[56] References Cited

UNITED STATES PATENTS

| | | | |
|---|---|---|---|
| 3,681,044 | 8/1972 | Ruszczyk et al. | 29/603 |
| 3,495,045 | 2/1970 | Varadi et al. | 179/100.2 C |

*Primary Examiner*—Vincent P. Canney
*Assistant Examiner*—Robert S. Tupper
*Attorney*—Frederick E. Hane et al.

[57] ABSTRACT

At least two parts of a magnetic head assembly are bonded together using glass-ceramic material in its ceramic phase.

1 Claim, 2 Drawing Figures

INVENTORS
KEITH MARIES
DEREK FRANK CASE
BY Hane, Baxley and Spiecens
ATTORNEYS

METHOD OF MAKING MAGNETIC HEAD ASSEMBLY HAVING GLASS CERAMIC BONDED PARTS

This invention relates to magnetic head assemblies and methods of manufacture therefor.

The magnetic head assemblies which are used for high density digital recording are relatively complex mechanical structures which have to be made to very small tolerances. For example, an assembly for use with a magnetic disc store may consist of a supporting arm which is linked to an air bearing slider, the actual recording head being mounted within the slider. The head must be positioned very accurately in relation to the disc, so the parts of the assembly must be manufactured and joined together in such a way that this accuracy is secured initially and is maintained during the working life of the assembly.

SUMMARY OF THE INVENTION

According to one aspect of the invention a magnetic head assembly has at least two parts, one of which is bonded to the other part by a glass-ceramic material in the ceramic phase.

According to another aspect of the invention a method of manufacturing a magnetic head assembly consisting of at least two parts includes the steps of accurately positioning two parts relative to each other with a small gap between surfaces of the two parts to be joined, placing a quantity of a glass-ceramic material adjacent to or in the gap, and subjecting the parts to heat treatment to cause the gap to be completely filled with the glass-ceramic in the ceramic phase.

DESCRIPTION OF THE PREFERRED EMBODIMENTS

The invention will now be particularly described, by way of example, with reference to magnetic head assemblies which are generally similar to those shown and described in copending Application Ser. No. 17,727, now U.S. Pat. No. 3,676,874, filed Mar. 9, 1970.

Figure 1:
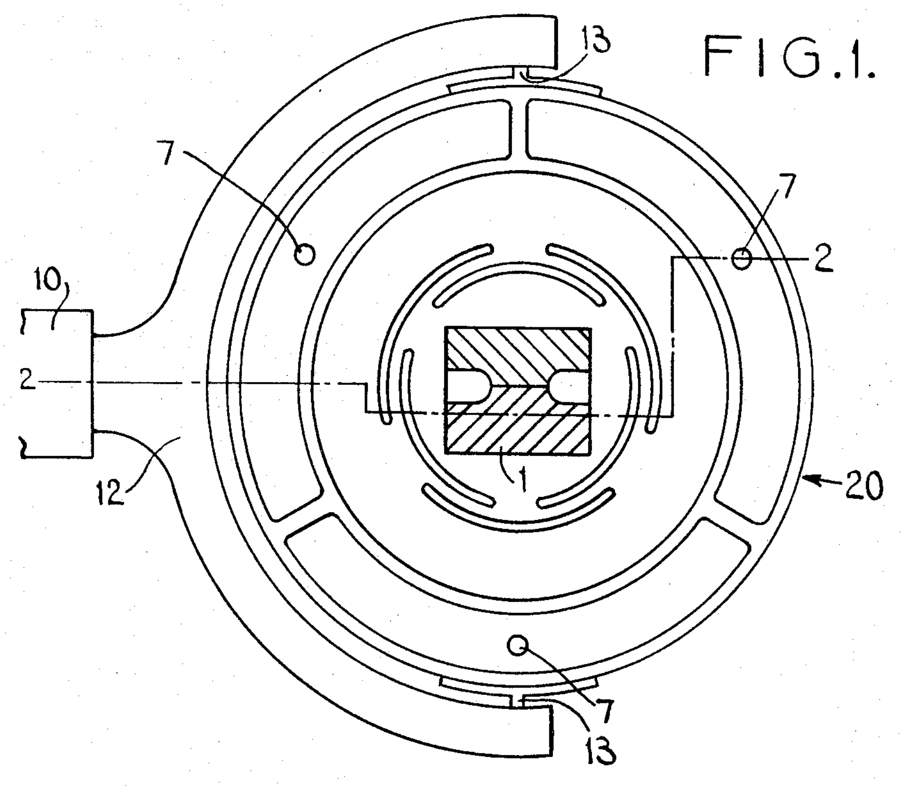
FIG. 1 shows the underside of a head assembly.
Figure 2:
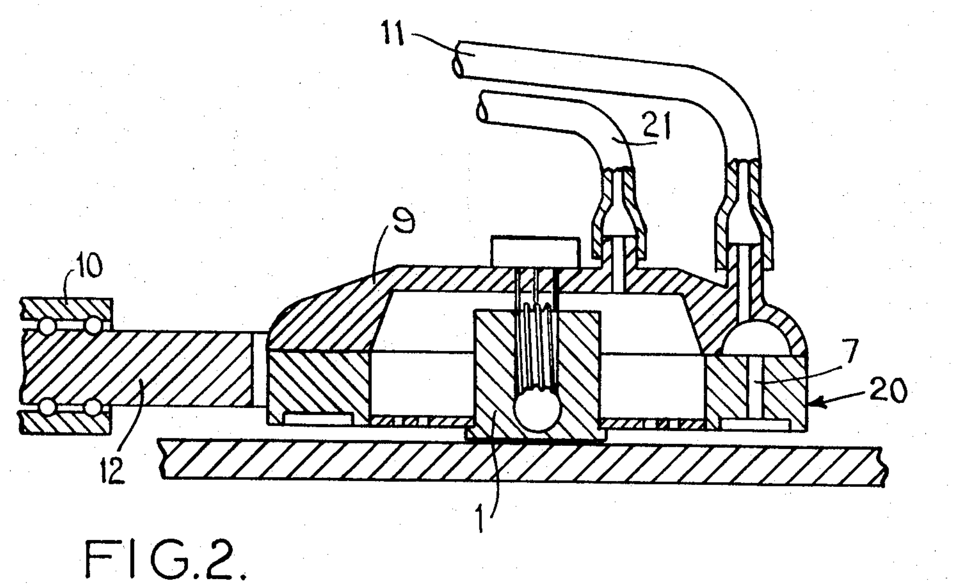
FIG. 2 is a section along lines 2—2 of FIG. 1.

Briefly, such assemblies are intended particularly for use with magnetic disc stores. They consist essentially of a metal support arm 10 which is coupled to a mechanism for positioning a head 1 in alignment with a desired track on a disc, and which carries a head pad unit 20 on pins 13 in a mount 12. The head pad unit is aerodynamically supported at a closely controlled spacing from the surface of the disc. The head pad includes a manifold 9 that may feed ducts 7 with air from lines 11 coacting with reduced pressure on line 21, as described in the above-mentioned patent application, or it may be self-acting, relying on the film of air which is carried along the disc. A magnetic read-record head 1 is mounted on the pad. The head pad and/or the head may be mounted in a gimbal type mount 12 to allow the pad and/or the head to accommodate inaccuracies in the absolute position of the surface of a disc 14 as it moves past the head.

Head pads are often made of a high density alumina ceramic. Alternatively, a suitable glass-ceramic material may be used for the head pad itself, as disclosed in copending Application No. 152,666.

Glass-ceramic materials are suitable for bonding the parts of the head assembly. They can be chosen to provide a co-efficient of expansion which is matched to the co-efficient of expansion of the parts to be joined and to provide a bond of relatively high strength over a wide temperature range. For example, the head pad, whether or not of conventional alumina ceramic, may be so joined via feet on the pins 13 to the gimbal arrangement which supports the pad on the supporting arm and/or the head on the pad. The bonding may be carried out by painting at the least one of the surfaces to be joined with a suspension in water of a suitable powdered glass-ceramic in the glass phase. The surfaces to be joined are brought together and held under pressure while they are heated. The heating first melts the powder so that it flows and forms a uniform film between the surfaces and then converts the glass-ceramic into the ceramic phase.

If a very thin bonding layer is desired, a technique may be used that is also useful for the manufacture of bonded ferrite components. In this method, the surfaces to be joined are held apart by spacers to determine the required gap between the surfaces and the powdered glass-ceramic is applied around the edges of the gap. When the glass-ceramic is melted by the heating, it flows in its glass phase into the gap as a result of capillary action and/or the effects of subjecting the parts to low pressure to remove residual gases and then to a higher pressure to force the liquid glass-ceramic into the gap. Conversion to ceramic phase can then take place.

The general properties of glass-ceramic materials are described in an article by G. Partridge and P.W. McMillan entitled "The Preparation and Properties of Glass-Ceramics Using Metallic Phosphates as Nucleation Catalysts," published in "Glass Technology," Vol. 4, No. 6, Pages 173 et seq.

One advantage arising from improvements in the head assembly is that high accuracy of head positioning relative to the magnetic recording surface allows high recording densities to be used. However, this gives rise to another problem, that of signal distortion caused by the relatively long leads which are necessary to connect the head to the read and write circuits which are mounted on the main frame of the disc store.

This problem may be overcome to a considerable extent by using circuits in the form of an integrated circuit chip 18, employing conventional monolithic or thin film semiconductor techniques, and mounting the circuit chip on the head assembly. Preferably, the circuit chip is mounted on the face of the heat pad which is remote from the recording surface. The chip is bonded to the head pad by the use of a glass-ceramic in the manner already described, on which the circuits are formed by conventional deposition techniques.

Bonding the read and write circuits to the head assembly clearly provides very short leads between the head and the circuits. It also has another advantage in that the air flow which is associated with the aerodynamic support of the head pad acts as a coolant for the circuits. Thus, the power dissipation of the circuits may be increased without the necessity for separate cooling arrangements. If very high power dissipations are required, the circuit chip may be mounted on the gimbal arrangement, or on the end of the support arm, so that the chip is substantially in contact with metal having a high thermal conductivity, which provides a heat sink effect additional to the air cooling.

What is claimed is:

1. A method of making a magnetic head assembly having at least two parts and comprising the steps of: accurately positioning the two parts relative to each other to form a narrow transducing gap between surfaces to be joined; placing a quantity of glass-ceramic forming material in its glass phase adjacent to or in the transducing gap; and bonding said parts together by subjecting the parts and the material to a heating regime to melt the material to cause the latter to form a glass film covering said surfaces; and continuing the heating so as to convert the film forming material from its glass phase into the glass-ceramic phase so that the glass ceramic bonds said parts together.

* * * * *